US011453380B2

(12) United States Patent
Lee

(10) Patent No.: US 11,453,380 B2
(45) Date of Patent: Sep. 27, 2022

(54) APPARATUS CONTROLLING A VEHICLE BASED ON PRECISE LOAD LEVEL USING GPS, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventor: Hyuk Jin Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 91 days.

(21) Appl. No.: 17/038,178

(22) Filed: Sep. 30, 2020

(65) Prior Publication Data

US 2021/0387609 A1 Dec. 16, 2021

(30) Foreign Application Priority Data

Jun. 15, 2020 (KR) .......................... 10-2020-0072558

(51) Int. Cl.
| | |
|---|---|
| *B60W 20/12* | (2016.01) |
| *G05D 1/02* | (2020.01) |
| *F02D 35/00* | (2006.01) |
| *B60K 6/22* | (2007.10) |

(52) U.S. Cl.
CPC ............ *B60W 20/12* (2016.01); *F02D 35/00* (2013.01); *G05D 1/0278* (2013.01); *B60K 6/22* (2013.01); *B60W 2520/10* (2013.01); *B60W 2552/15* (2020.02); *B60W 2552/25* (2020.02); *B60Y 2200/92* (2013.01); *B60Y 2300/181* (2013.01); *G05D 2201/0213* (2013.01)

(58) Field of Classification Search
CPC ............ B60W 20/12; B60W 2552/15; B60W 2552/20; B60W 2552/25; G05D 1/0278; F02D 35/00
USPC ....................................... 701/102, 32.3, 32.4
See application file for complete search history.

(56) References Cited

U.S. PATENT DOCUMENTS

| | | | | |
|---|---|---|---|---|
| 7,035,733 | B1 * | 4/2006 | Alwar | G01C 21/26 340/995.18 |
| 2003/0216847 | A1 * | 11/2003 | Bellinger | F16H 61/66 701/72 |
| 2009/0118096 | A1 * | 5/2009 | Boutell | F16H 63/50 477/120 |
| 2012/0239588 | A1 * | 9/2012 | Sujan | G06Q 10/047 705/338 |
| 2014/0277878 | A1 * | 9/2014 | Manickaraj | B60W 20/12 180/65.21 |
| 2016/0023649 | A1 * | 1/2016 | Muller | B60W 50/0097 701/22 |
| 2017/0138466 | A1 * | 5/2017 | Jerger | B60W 40/076 |
| 2020/0398810 | A1 * | 12/2020 | Zebiak | B60W 30/143 |

\* cited by examiner

*Primary Examiner* — Robert A Werner
(74) *Attorney, Agent, or Firm* — Lempia Summerfield Katz LLC

(57) ABSTRACT

A vehicle control apparatus based on a precise load level using a GPS includes: a load level calculator to determine a load level of a road based on GPS information; a load level controller that classifies the road into a plurality of regions based on the determined load level and differentially controls an engine power output for each of the regions; and a storage to store a map for the engine power output for each of the regions.

20 Claims, 10 Drawing Sheets

APPARATUS CONTROLLING A VEHICLE BASED ON PRECISE LOAD LEVEL USING GPS, SYSTEM HAVING THE SAME AND METHOD THEREOF

CROSS-REFERENCE TO RELATED APPLICATION

This application claims priority to and the benefits of Korean Patent Application No. 10-2020-0072558, filed on Jun. 15, 2020, the entire contents of which are incorporated herein by reference.

FIELD

The present disclosure relates to a vehicle control apparatus based on a precise load level using a global positioning system (GPS), a system including the same, and a method thereof, and more particularly, to a technique capable of controlling a vehicle by accurately determining a load level using a GPS.

BACKGROUND

The statements in this section merely provide background information related to the present disclosure and may not constitute prior art.

A vehicle is a machine that drives a wheel and moves on a road. Such vehicles include internal combustion engine vehicles (general engine vehicles) that generate mechanical power by burning petroleum fuels such as gasoline and diesel and uses this mechanical power to drive the vehicles, and eco-friendly vehicles that drive by using electricity as power, to reduce fuel consumption and harmful gas emissions.

Herein, the eco-friendly vehicles include an electric vehicle that includes a battery which is a rechargeable power supply and a motor, and rotates the motor with electricity accumulated in the battery, and drives wheels by using rotation of the motor; a hybrid vehicle that includes an engine, a battery, and a motor, and controls mechanical power of the engine and electrical power of the motor to drive wheels; and hydrogen fuel cell vehicles.

When a vehicle is driving in a region with a slope, engine power may be controlled depending on a load level by determining the load level based on gravitational acceleration.

Conventionally, the load level is determined through several controllers, and thus it takes a lot of time, making real-time determination difficult, and accuracy of load level determination is low.

In particular, autonomous driving technology is trending in the automobile market recently, and commercialization of unmanned vehicles is not far away. As fourth industry emerges, a sensor industry market is growing explosively, and necessity for accuracy of control using more precise sensors is emerging.

The above information disclosed in this Background section is only for enhancement of understanding of the background of the present disclosure, and therefore it may contain information that does not form the prior art that is already known to a person of ordinary skill in the art.

SUMMARY

The present disclosure provides a vehicle control apparatus based on a precise load level using a global positioning system (GPS), a system including the same, and a method thereof, capable of early starting an engine depending on a load level during driving in a rugged region by accurately determining the load level based on an altitude variation and a vehicle speed by the GPS and classifying a road into the rugged region and a normal region, thereby precisely controlling a vehicle depending on the load level in real time.

The technical objects of the present disclosure are not limited to the objects mentioned above, and other technical objects not mentioned can be clearly understood by those skilled in the art from the description of the claims.

In an exemplary form of the present disclosure, a vehicle control apparatus includes: a load level calculator configured to determine a load level of a road based on GPS information; a load level controller configured to classify the road into a plurality of regions based on the load level, and differentially control an engine power output for each region of the plurality of regions; and a storage configured to stores a map for the engine power output for each region of the plurality of regions.

In an exemplary form, the load level calculator may calculate an altitude variation based on a position change of a vehicle based on the GPS information, may calculate a distance variation by differentiating a vehicle speed of the vehicle, and may calculate the load level by dividing the altitude variation by the distance variation.

In an exemplary form, the load level calculator may include a motor control unit (MCU).

In an exemplary form, the storage may include a first map to which an engine power output for each load level stage calculated based on gravitational acceleration is mapped, a second map to which the engine power output for each load level stage calculated based on the GPS information is mapped, and a third map to which a correction factor for each slope change rate per unit time is mapped.

In an exemplary form, the load level controller may classify the road into a normal region, a rugged region, and a sudden region based on the load level.

In an exemplary form, the load level controller may include a hybrid control unit (HCU).

In an exemplary form, the load level controller may determine that the vehicle is the rugged region when the load level is equal to or greater than a predetermined rugged region entry threshold value, and may determine that the vehicle is in the normal region when the load level is smaller than the predetermined rugged region entry threshold value.

In an exemplary form, the load level controller may calculate a slope change rate per unit time in a state where the vehicle is in the rugged region.

In an exemplary form, the load level controller may determine that the vehicle is in the sudden region when a slope change rate per unit time is equal to or greater than a predetermined sudden region entry threshold value.

In an exemplary form, the load level controller may control the engine power output based on a first map to which an engine power output for each load level stage based on gravitational acceleration is mapped when the vehicle is in the normal region;

In an exemplary form, the load level controller, when the vehicle is in the rugged region, may control the engine power output based on a second map to which the engine power output depending on the load level based on the GPS information is mapped.

In an exemplary form, the load level controller may control the engine power output by operating the correction factor depending on the slope change rate per unit time for the engine power output outputted based on the second map when the vehicle is in the sudden region.

In an exemplary form, a section of the engine power output depending on the load level based on the GPS information of the second map may be minutely divided and set compared with the load level stage of the first map.

In an exemplary form, the load level controller may increase the engine power output initially when the vehicle enters the sudden region.

In an exemplary form, the load level calculator may determine the load level of the road based on the GPS information in real time, and the load level controller may control the engine power output for each of the regions.

In an exemplary form of the present disclosure, a vehicle system includes: a GPS receiver configured to receive GPS information; and a load level controller configured to: determine a load level of a road based on GPS information, classify the road into a plurality of regions based on the load level, and differentially control an engine power output for each region of the plurality of regions.

In another exemplary form of the present disclosure, a vehicle control method includes: determine, by a load level calculator, a load level of a road based on GPS information; classifying, by a load level controller, the road into a plurality of regions based on the load level; and differentially controlling, by the load level controller, an engine power output for each region of the plurality of regions.

In an exemplary form, the determining of the load level may include calculating an altitude variation depending on a position change of a vehicle based on the GPS information, calculating a distance variation by differentiating a vehicle speed of the vehicle, and calculating the load level by dividing the altitude variation by the distance variation.

In an exemplary form, the classifying of the road into the regions may include classifying the road into a normal region, a rugged region, and a sudden region based on the load level.

In an exemplary form, the classifying of the road into the regions may include determining that a vehicle is the rugged region when the load level is equal to or greater than a predetermined rugged region entry threshold value, and determining that the vehicle is in the normal region when the load level is smaller than the predetermined rugged region entry threshold value.

In an exemplary form, the classifying of the road into the regions may include calculating a slope change rate per unit time in a state where a vehicle is in the rugged region; determining that the vehicle is in the sudden region when the slope change rate per unit time is equal to or greater than a predetermined sudden region entry threshold value.

In an exemplary form, the differentially controlling of an engine power output for each of the regions controlling the engine power output based on a first map to which an engine power output for each load level stage based on gravitational acceleration is mapped when it is in the normal region; controlling the engine power output based on a second map to which an engine power output for each load level stage based on the GPS information is mapped; and controlling the engine power output based on a third map that operates a correction factor depending on the slope change rate per unit time for the engine power output based on the second map when it is in the sudden region.

According to the exemplary forms of the present technique, it is possible to early start an engine depending on a load level during driving in a rugged region by accurately determining the load level based on an altitude variation and a vehicle speed by the GPS and classifying a road into the rugged region and a normal region, thereby precisely controlling a vehicle depending on the load level in real time.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
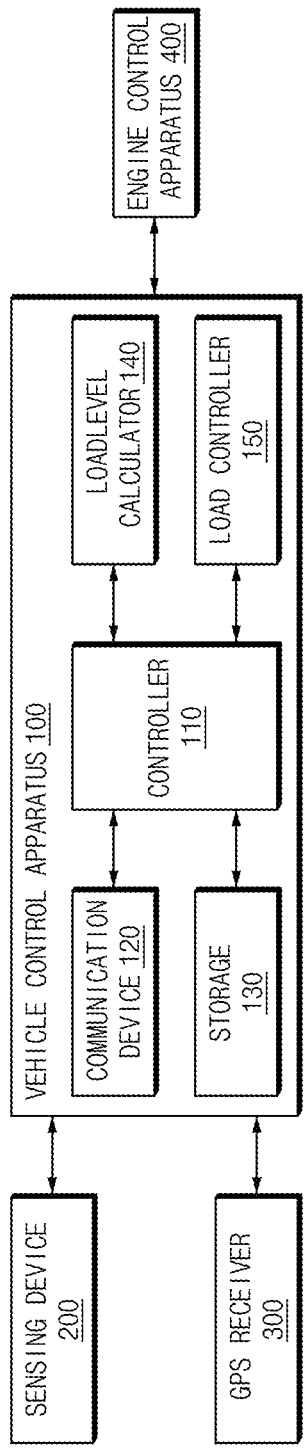
FIG. 1 illustrates a block diagram showing a configuration of a vehicle system including a vehicle control apparatus based on a precise load level using a global positioning system (GPS) according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a technique capable of improving accuracy by determining a load level using a global positioning system (GPS) signal, and thereby improving accuracy at a vehicle control time point to be capable of real-time precise control instead of section-by-section control.

Hereinafter, exemplary forms of the present disclosure will be described in detail with reference to FIG. 1 to FIG. 12.

FIG. 1 illustrates a block diagram showing a configuration of a vehicle system including a vehicle control apparatus based on a precise load level using a global positioning system (GPS) according to an exemplary form of the present disclosure.

Referring to FIG. 1, the vehicle system may include: a vehicle control apparatus 100, a sensing device 200, a global positioning system (GPS) receiver 300, and an engine control apparatus 400.

The vehicle control apparatus 100, which precisely detects a load level based on a GPS based precise load level control (GPLC) and controls a vehicle accordingly, may secure a hill climbing ability by extracting the load level in real time based on GPS information, classifying a path into a normal region, a rugged region, and a sudden region based on the load level, performing engine power control differentiated for each of the regions, and responsively performing a quick power output in real time depending on the load level.

The sensing device 200 may include a G sensor for sensing gravitational acceleration G of a vehicle, a vehicle speed sensor for sensing a vehicle speed of the vehicle, and the like.

The GPS receiver 300 may receive position information from an artificial satellite, and provide altitude and a vehicle speed depending on a vehicle position to the vehicle control apparatus 100.

The engine control apparatus 400 may be configured to control engine driving of the vehicle by being controlled by the vehicle control apparatus 100, and may include a controller for controlling a speed of the vehicle.

As illustrated in FIG. 1, the vehicle control apparatus 100 may be implemented inside the vehicle, may be integrally formed with internal control units of the vehicle, or may be implemented as a separate device to be connected to control units of the vehicle by a separate connection means.

The vehicle control apparatus 100 may include: a controller 110, a communication device 120, a storage 130, a load level calculator 140, and a load level controller 150. Herein, the controller 110, the load level calculator 140, and the load level controller 150 of the vehicle control apparatus 100 may be implemented as at least one processor.

The controller 110 may control an overall operation of each component. The controller 110 may be electrically connected to the communication device 120, the storage 130, the load level calculator 140, the load level controller 150, and the like, may electrically control each component, and may be an electrical circuit that executes software commands, thereby performing various data processing and calculations described below. The controller 110 may be, e.g., an electronic control unit (ECU), a micro controller unit (MCU), or other subcontrollers mounted in the vehicle.

The communication device 120, which is a hardware device implemented with various electronic circuits to transmit and receive signals through a wireless or wired connection, may perform V2I communication by using an in-vehicle network communication technique or a wireless Internet access or short range communication technique with servers, infrastructure, and other vehicles outside the vehicle in the present disclosure. Herein, in-vehicle communication may be performed through controller area network (CAN) communication, local interconnect network (LIN) communication, or flex-ray communication as the in-vehicle network communication technique. In addition, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 120 may receive sensing results, GPS information, and the like from the sensing device 200 and the GPS receiver 300. In this case, the sensing results may include a G sensor value, a vehicle speed, and the like.

The storage 130 may store sensing results, GPS information, etc. received from the sensing device 200 and the GPS receiver 300, data obtained by the load level calculator 140 and the load level controller 150, data and/or algorithms required to operate, and the like.

As an example, the storage 130 may include a first map (normal map) to which an engine power output for each load level stage calculated based on gravitational acceleration is mapped, a second map (rugged map) to which the engine power output for each load level stage calculated based on the GPS information is mapped, and a third map (sudden map) to which a correction factor for each slope change rate per unit time is mapped. In this case, the first map, the second map, and the third map may be determined by experiment values to be stored.

As an example, the storage 130 may store position information of a vehicle, a path to a destination, road information, and the like, which are received through navigation or the like.

The storage 130 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The load level calculator 140 may calculate a load level stage by calculating the load level based on the gravitational acceleration and the vehicle speed. It may be determined in advance by an experimental value, and may be stored in, e.g., a table 401 in FIG. 4.

The load level calculator 140 calculates an altitude variation and a vehicle speed differential value depending on movement of the vehicle, and calculates the load level by using a distance variation depending on the altitude variation and the vehicle speed differential value. That is, the load level calculator 140 may calculate an average altitude difference from a starting point to a destination as the altitude variation in real time. In addition, the load level calculator 140 may calculate a precise load level by using Equation 1 below:

$$\text{Precise load level} = \frac{\frac{dE}{dt}}{\frac{dD}{dt}} \quad \text{[Equation 1]}$$

In Equation 1, E indicates the altitude, D indicates the moving distance of the vehicle, and the load level calculator 140 may calculate the precise load level by dividing the altitude variation by the distance variation.

The load level calculator 140 may be a motor control unit (MCU). In this case, since a processing speed of the motor control unit is fast, real time load level calculation is easy.

Figure 2:
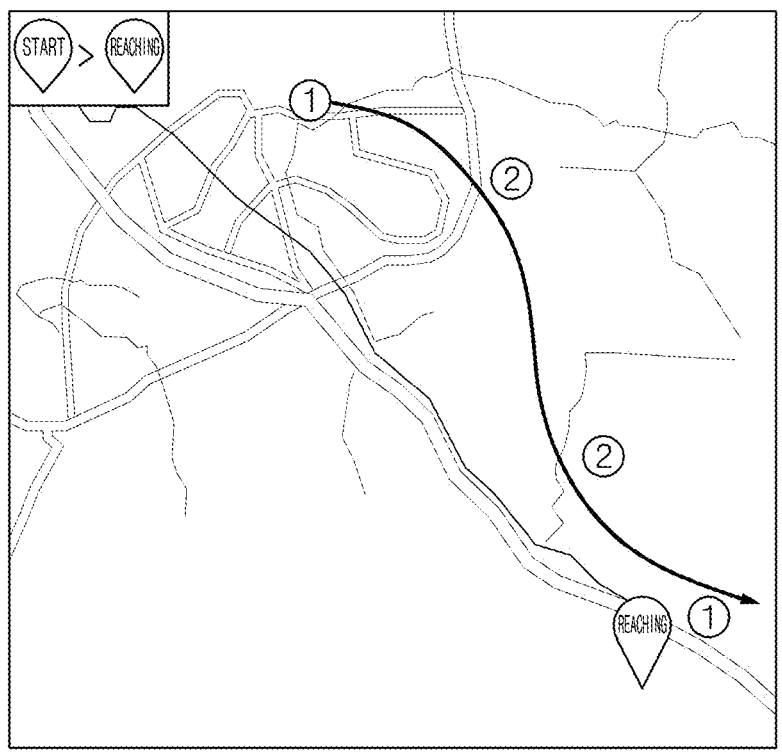
FIG. 2 illustrates an example of a screen for describing a method for determining a load level in real time using a GPS according to an exemplary form of the present disclosure.

As illustrated in FIG. 2, the load level calculator 140 may calculate the altitude variation (①) and the vehicle speed differential value (②) from the starting point to the destination in real time, and may determine the load level of a path from the starting point to the destination. FIG. 2 illustrates an example of a screen for describing a method for determining a load level in real time using a GPS according to an exemplary form of the present disclosure.

The load level controller 150 may classify the path into a plurality of regions based on the load level, to differentially control engine power output for each of the regions. The regions may include a normal region, a rugged region, and a sudden region.

Figure 3:
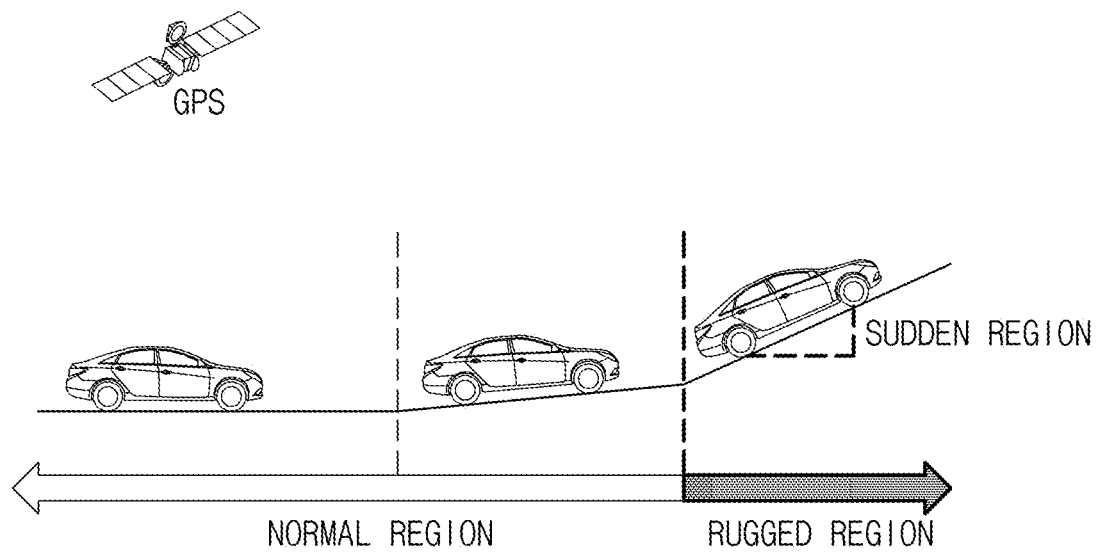
FIG. 3 illustrates an example of a screen for describing a normal region and a rugged region based on a load level according to an exemplary form of the present disclosure.

As illustrated in FIG. 3, the normal region corresponds to a flat surface with a precise load level of 0 and a case where the precise load level is smaller than a predetermined threshold value, the rugged region corresponds to a case where the precise load level is greater than a predetermined threshold value, and the sudden region may correspond to a case where a slope change rate per unit time is suddenly changing in the rugged region. FIG. 3 illustrates an example of a screen for describing a normal region and a rugged region depending on a load level according to an exemplary form of the present disclosure.

The load level controller 150 determines that a vehicle is in the rugged region when the precise load level is equal to or greater than a predetermined rugged region entry threshold value, and determines that it is in the normal region when the precise load level is smaller than the rugged region entry threshold value.

When the precise load level is smaller than a predetermined rugged region release threshold value after it enters the rugged region, the load level controller 150 may determine that the vehicle enters the normal region beyond the rugged region.

In addition, the load level controller 150 may determine that it is in the sudden region when the slope change rate per unit time is equal to or greater than a predetermined sudden region entry threshold value after it enters the rugged region.

In addition, when the slope change rate per unit time is smaller than the predetermined sudden region release threshold value after it enters the sudden region, the load level controller 150 may determine that the vehicle enters the rugged region beyond the sudden region.

In this case, the rugged region entry threshold value, the rugged region release threshold value, the sudden region entry threshold value, and the sudden region release threshold value may be determined in advance by experimental values.

Accordingly, when it is in the normal region, the load level controller 150 may control an engine power output based on a first map 401 (see FIG. 4) to which the engine power output for each load level stage based on the gravitational acceleration is mapped.

As such, the load level controller 150 may control the engine power output by using a load level stepwise map in a gentle slope section and a steel sheet section.

The load level controller 150 may control the engine power output based on a second map to which the engine power output based on the load level and GPS information is mapped.

In the rugged region, the load level controller 150 may induce early engine power-on depending on a load level variation depending on a second map 501 (see FIG. 5) that is set by minutely dividing a precise load level slop.

In this case, a section of the engine power output depending on the load level based on the GPS information of the second map may be minutely divided and set compared with the load level stage of the first map.

The load level controller 150 may control the engine power output by operating the correction factor depending on the slope change rate per unit time for the engine power output outputted based on the second map when it is in the sudden region. That is, when the vehicle enters the sudden region, the load level controller 150 copes with it by increasing the engine power output initially. That is, the load level controller 150 may induce agile engine power-on by determining a large output very quickly that is desired depending on a rapidly changing slope.

The load level calculator 140 may be a hybrid control unit (HCU).

Figure 4:
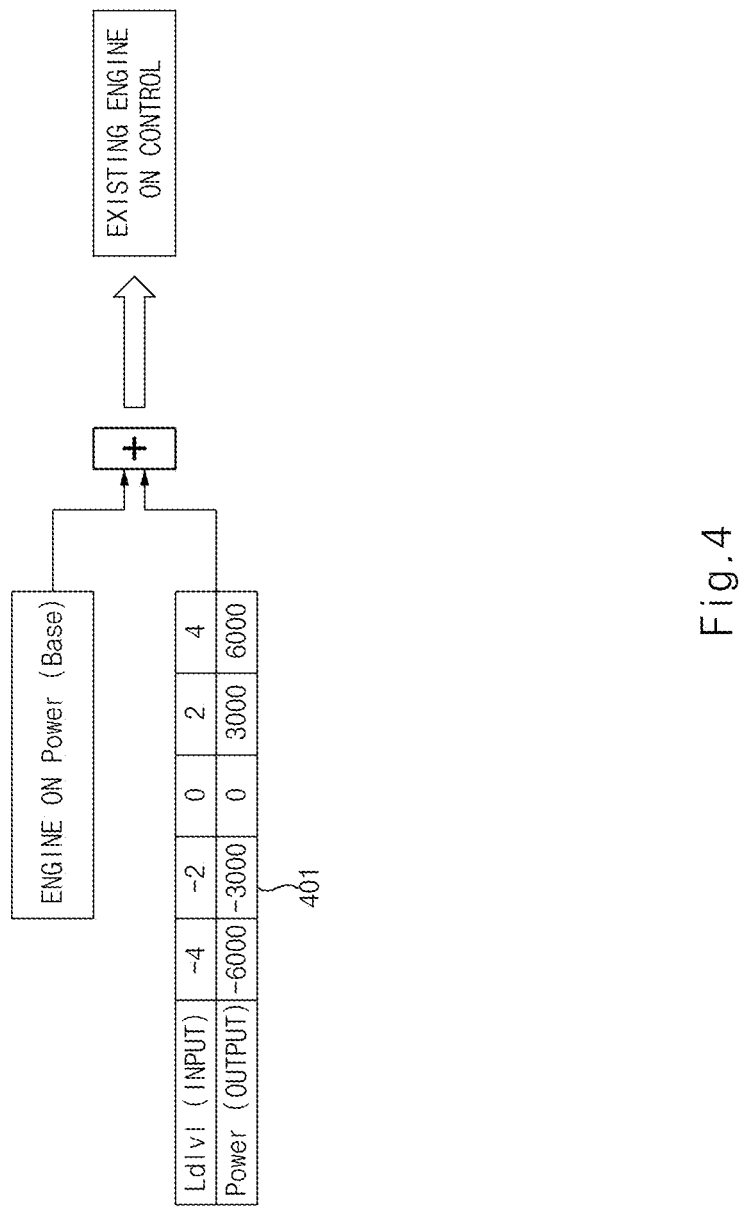
FIG. 4 illustrates a view for describing an operation method of a first map (normal map) that is driven in a normal region according to an exemplary form of the present disclosure.

FIG. 4 illustrates a view for describing an operation method of a first map (normal map) that is driven in a normal region according to an exemplary form of the present disclosure.

Referring to FIG. 4, the apparatus 100 controls the engine power output by using the first map 401 to which the engine power output for each load level stage based on the gravitational acceleration using the G sensor, etc. is mapped in the normal region where the slope is not significant. In the normal region, the load level is 0 or less than a predetermined threshold value.

In this case, the load level stages are divided into −4, −2, 0, 2, and 4, and are set to be rough, so it is difficult to quickly perform the engine power output. The apparatus 100 may output the engine power by adding the engine power output depending on the load level stage into engine on power (base).

For example, when the load level stage by the G sensor is 2, the engine power is 3000, and thus 3000 is added to the engine on power to output it as engine power. When the load level stage is rough as described above, it may be difficult to quickly perform the engine power output.

Figure 5:
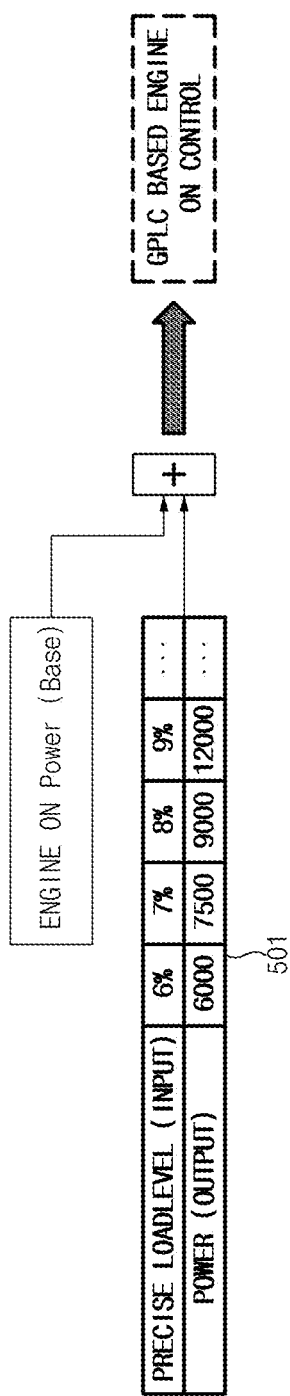
FIG. 5 illustrates a view for describing an operation method of a second map (rugged map) that is driven in a rugged region according to an exemplary form of the present disclosure.

FIG. 5 illustrates a view for describing an operation method of a second map (rugged map) that is driven in a rugged region according to an exemplary form of the present disclosure.

Referring to FIG. 5, like a second map 502, in the rugged region with a high precise load level, the engine power output is changed for every 1% of the precise load level in the rugged region where the precise load level is high. That is, a range of the precise load level range is subdivided, so that the engine power output may be more quickly performed.

The apparatus 100 may output the engine power based on GPS based precise load level control (GPLC) by adding the engine power output depending on the precise load level into engine on power (base). For example, when the GPS-based precise load level is 7%, the engine power is 7500, 7500 may be added to the engine on power to output it as the engine power, early engine on may be induced at beginning of entering the load level, and particularly, the control may be performed such that the engine is always on in a section of 10% or more with a high load level (e.g., a section of a low accelerator position sensor (APS)).

Figure 6:
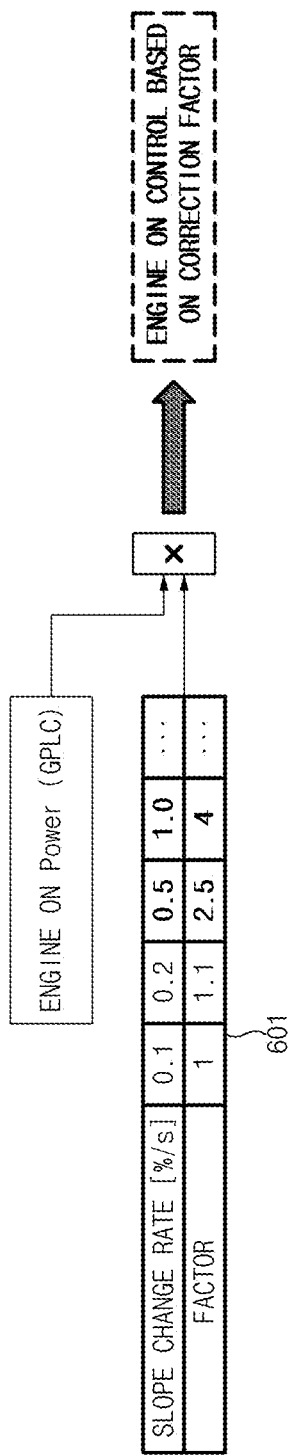
FIG. 6 illustrates a view for describing an operation method of a third map (sudden map) that is driven in a normal region according to an exemplary form of the present disclosure.

FIG. 6 illustrates a view for describing an operation method of a third map (sudden map) that is driven in a standard according to an exemplary form of the present disclosure.

Referring to FIG. 6, a third map 601 is set by mapping a correction factor depending on a slope change rate per unit time. The apparatus 100 may output the engine power based on a rapidly changing slope by multiplying the engine power output (based on GPLC) calculated based on the second map (rugged map) of FIG. 5 by a correction factor for each slope change rate per unit time. For example, when the engine power output (based on GPLC) calculated based on the second map (rugged map) is 6000 and the slope change rate is 0.5, the apparatus 100 may be controlled to output the engine power of 1500 by multiplying 6000 by the factor of 2.5.

As such, a section that desires a large amount of engine power output instantaneously due to a sudden change in slope may secure power performance through a quick output response.

According to the present exemplary form, the apparatus 100 which is operated as the above may be implemented in a form of an independent hardware device including a memory and a processor that processes each operation, and may be driven in a form included in other hardware devices such as a microprocessor or a general purpose computer system.

Figure 7:
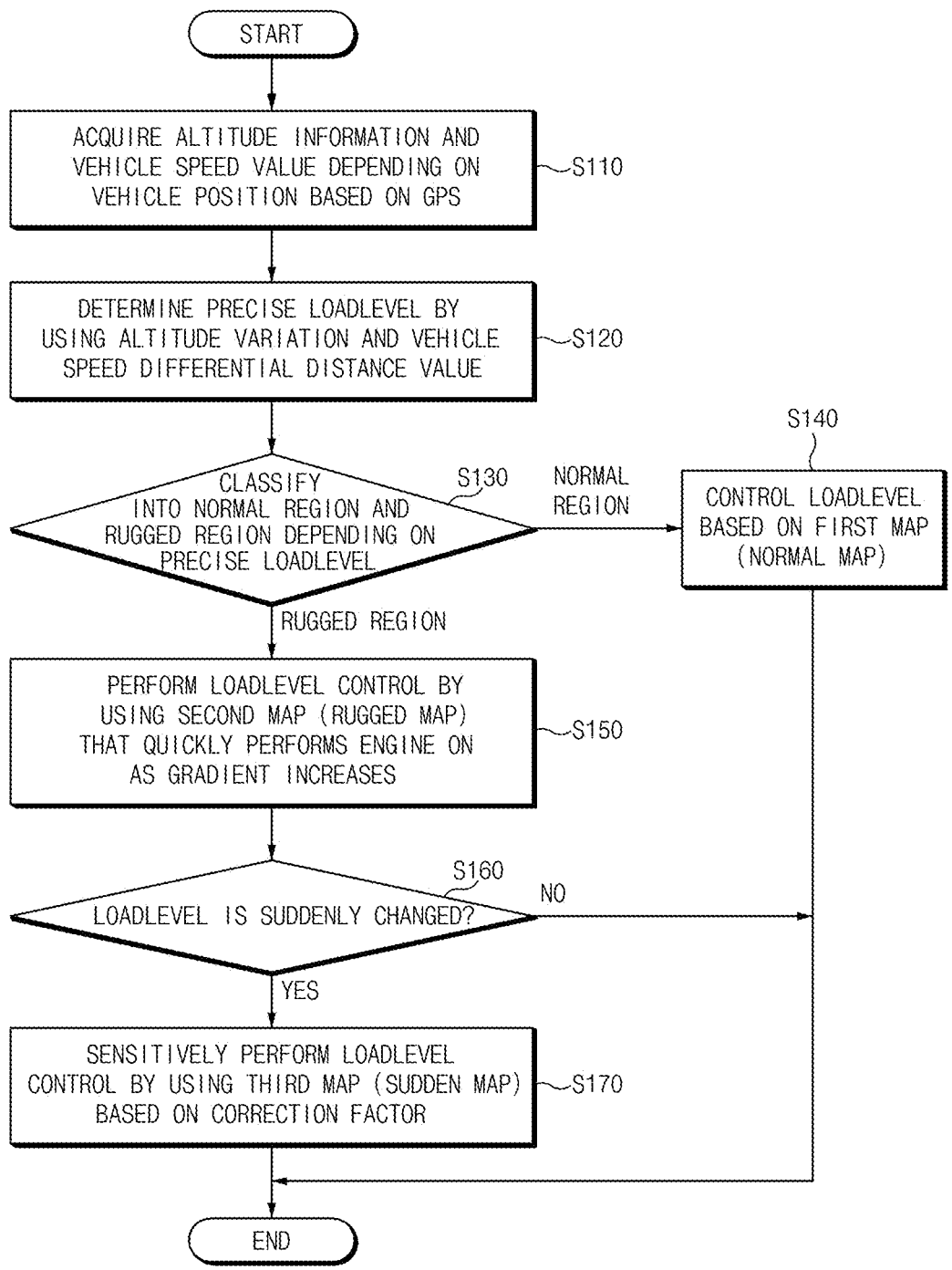
FIG. 7 illustrates a flowchart for describing a vehicle control method based on a precise load level using a GPS according to an exemplary form of the present disclosure.

Hereinafter, a vehicle control method based on a precise load level using a GPS according to an exemplary form of the present disclosure will be described in detail with reference to FIG. 7. FIG. 7 illustrates a flowchart for describing a vehicle control method based on a precise load level using a GPS according to an exemplary form of the present disclosure.

Hereinafter, it is assumed that the vehicle control apparatus 100 based on the precise load level using the GPS in FIG. 1 performs processes of FIG. 7. In addition, in the description of FIG. 7, operations described as being performed by a device may be understood as being controlled by the load level calculator 140 of the vehicle control apparatus 100 based on the precise load level using the GPS.

Referring to FIG. 7, the vehicle control apparatus 100 based on the precise load level using the GPS may acquire altitude information and a vehicle speed value depending on position of a vehicle based on GPS information (S110), and may calculate an altitude variation and a vehicle speed differential distance value using the altitude information and the vehicle speed value depending on the vehicle position, and may determine a high precise load level using the altitude variation and the vehicle speed differential distance value (S120).

The vehicle control apparatus 100 classifies a road into a normal region and a rugged region depending on the precise load level (S130). That is, the load level controller 150 may determine that a vehicle enters the rugged region when the precise load level is equal to or greater than a predetermined rugged region entry threshold value, and may determine that it is in the normal region when the precise load level is smaller than the predetermined rugged region entry threshold value. In addition, the vehicle control apparatus 100 may determine that it is out of the rugged region when the precise load level is smaller than a predetermined rugged region release threshold value.

When it is determined that it is in the normal region, the vehicle control apparatus 100 outputs the engine power based on the first map (normal map) to perform load level control. That is, the vehicle control apparatus 100 roughly performs the load level control depending on the first map that is divided as a rough load level stage.

On the other hand, when it is determined that it is in the rugged region, the vehicle control apparatus 100 outputs the engine power based on the second map (rugged map) to perform the load level control (S150). That is, the vehicle control apparatus 100 may output the engine power depending on the load level that is subdivided depending on the precise load level based on the GPS. Accordingly, when it enters the rugged region where the load level is high, the engine power output may be increased at beginning by minutely adjusting an engine power output value depending on the precise load level by pre-setting the engine power output value whenever the precise load level is changed by 1% in the rugged region, thereby increasing a hill climbing ability when driven during load level driving.

The slope change rate per unit time may be calculated during the load level control in the rugged region, and when the slope change rate is greater than or equal to a predetermined sudden region entry threshold value, it may be determined that it enters the sudden region (S160).

When it enters the sudden region, the vehicle control apparatus 100 may determine the engine power output by using the third map (sudden map) to perform the load level control (S170). The third map may be outputted by correcting the engine power by multiplying the engine power output that is outputted by the second map by the correction factor depending on the slope change rate per unit time. Accordingly, in a section where the load level is suddenly increased, the engine power output may be further increased to further improve the hill climbing ability of the vehicle.

Figure 8:
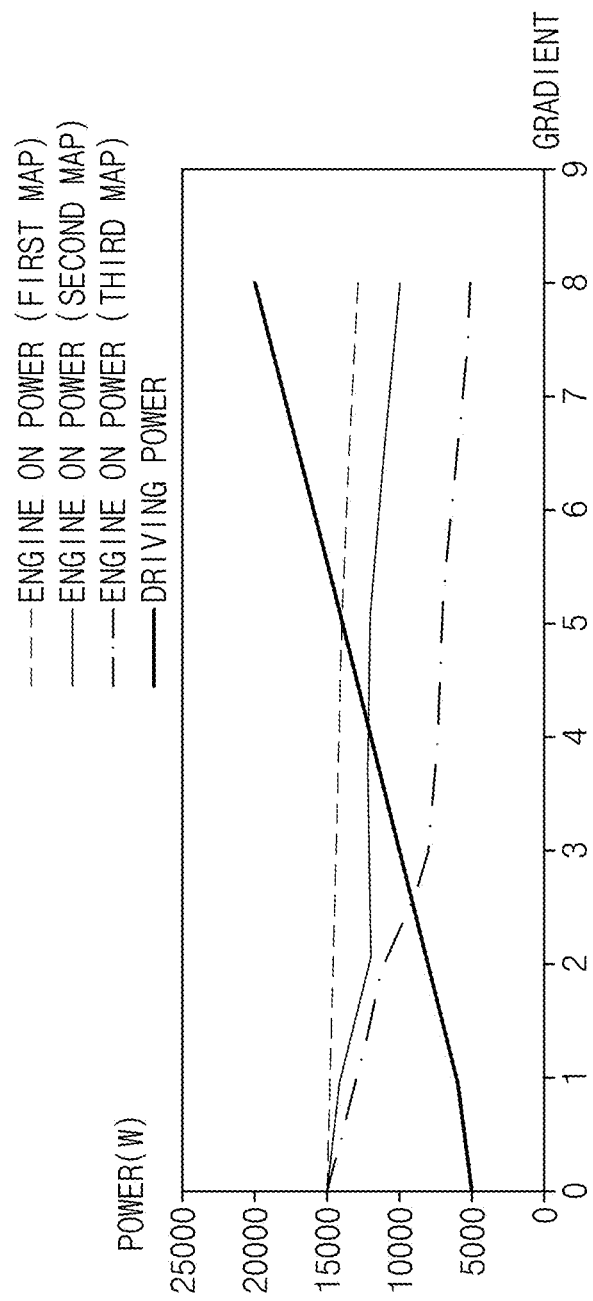
FIG. 8 illustrates a graph of an engine power change based on a load level according to an exemplary form of the present disclosure.
Figure 9:
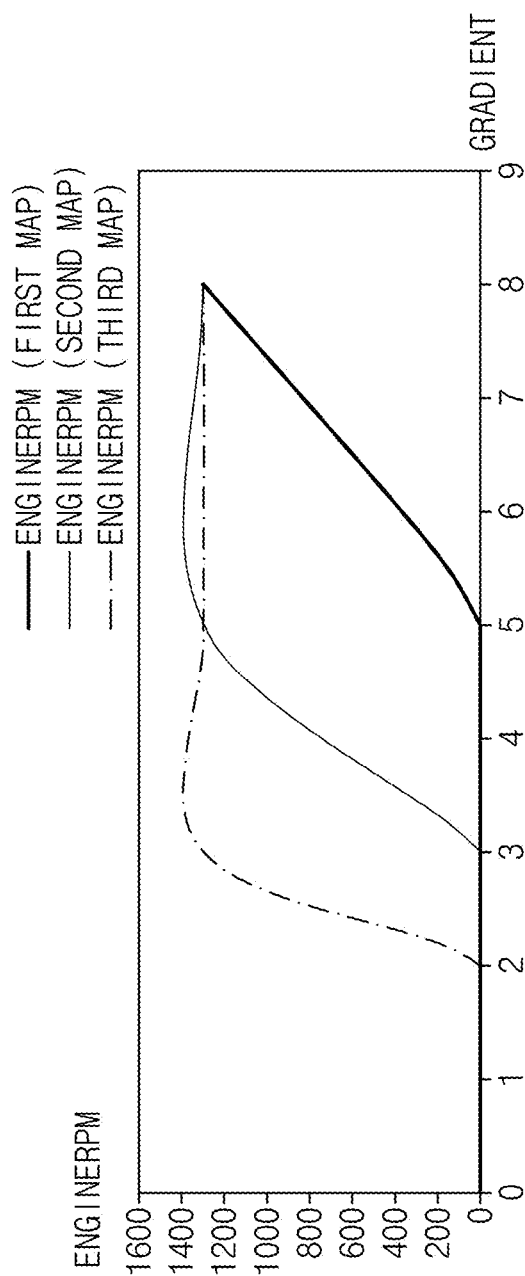
FIG. 9 illustrates a graph of an engine RPM change based on a load level according to an exemplary form of the present disclosure.

FIG. 8 illustrates a graph of an engine power change depending on a load level according to an exemplary form of the present disclosure, and FIG. 9 illustrates a graph of an engine RPM change depending on a load level according to an exemplary form of the present disclosure.

Referring to FIG. 8, it can be seen that, as a gradient increases, driving power desired for driving increases, in the case of applying the first map, the engine power is turned on in a stage where the gradient is 5, in the case of applying the second map, the engine power is turned on in a stage where the gradient is 4, and in the case of applying the third map, the engine power is turned on in a stage the gradient is 2.5.

Referring to FIG. 9, it can be seen that, as the gradient increases, an engine RPM increases, in the case of applying the first map, it starts to increase when the gradient is 5, in the case of applying the second map, it starts to increase when the gradient is 3, and in the case of applying the third map, it starts to increase when the gradient is 2.

As described above, according to the present disclosure, engine on may be induced early by applying the precise load level (second map and third map) based on the GPS, whereby the engine power may be added to the motor output to secure a driving force early, thereby improving the hill climbing ability.

In addition, according to the present disclosure, it is possible to inhibit or prevent a sudden exhaustion of a state of charge (SOC) due to the motor driving by the early engine on, thereby securing a degree of freedom in SOC balancing.

Figure 10:
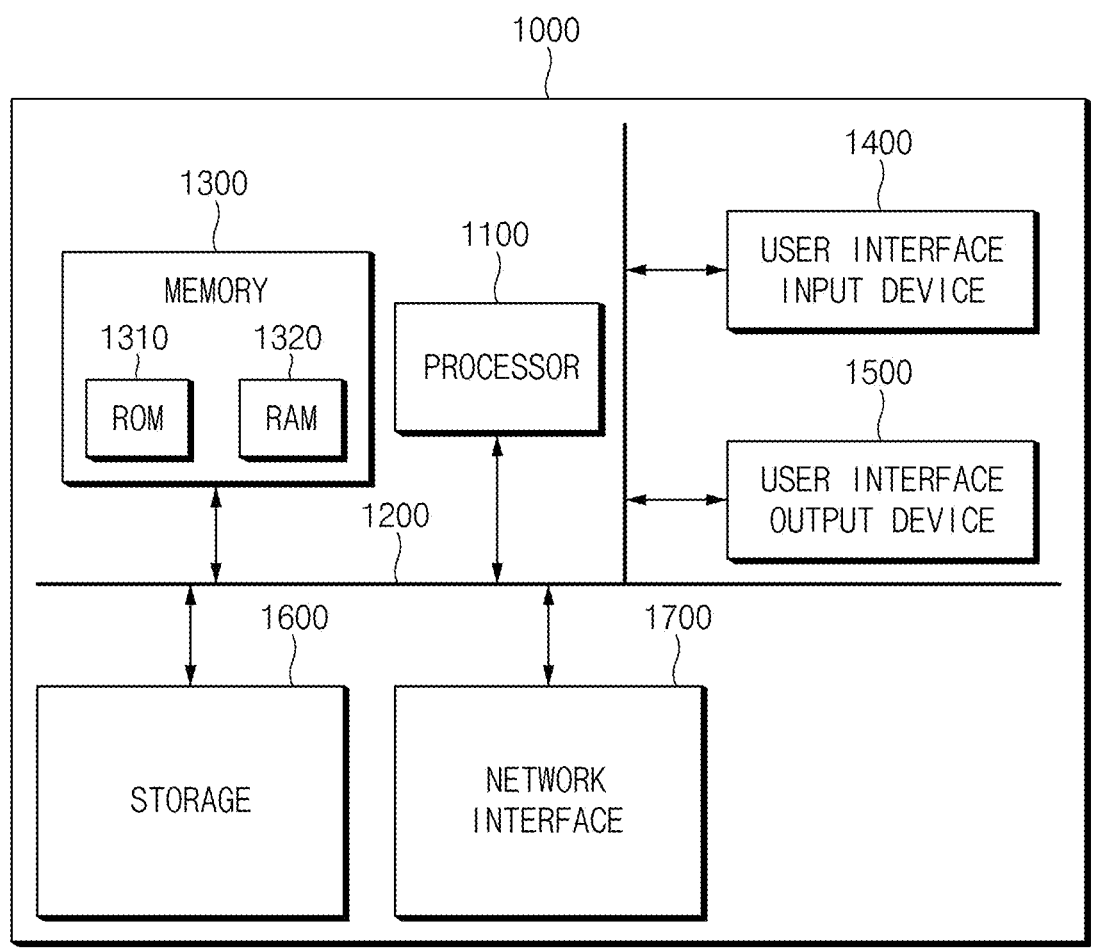
FIG. 10 illustrates a computing system according to an exemplary form of the present disclosure.

FIG. 10 illustrates a computing system according to an exemplary form of the present disclosure.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary forms disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms.

What is claimed is:

1. A vehicle control apparatus comprising:
a load level calculator configured to determine a load level of a road based on global positioning system (GPS) information;
a load level controller configured to: classify the road into a plurality of regions based on the determined load level, and differentially control an engine power output for each region of the plurality of regions; and
a storage configured to store a map for the engine power output for each region of the plurality of regions,
wherein the storage is further configured to store:
a first map to which an engine power output for each load level stage calculated based on gravitational acceleration is mapped; and
a second map to which an engine power output for each load level stage calculated based on the GPS information is mapped.

2. The vehicle control apparatus of claim 1, wherein the load level calculator is configured to:
calculate an altitude variation based on a position change of a vehicle based on the GPS information,
calculate a distance variation by differentiating a vehicle speed of the vehicle, and
calculate the load level by dividing the altitude variation by the distance variation.

3. The vehicle control apparatus of claim 1, wherein the load level calculator includes a motor control unit (MCU).

4. The vehicle control apparatus of claim 1, wherein the storage is further configured to store:
a third map to which a correction factor for each slope change rate per unit time is mapped.

5. The vehicle control apparatus of claim 1, wherein the plurality of regions includes: a normal region, a rugged region, and a sudden region based on the determined load level.

6. The vehicle control apparatus of claim 5, wherein the load level controller includes a hybrid control unit (HCU).

7. The vehicle control apparatus of claim 5, wherein the load level controller is configured to: determine that a vehicle is in the rugged region when the determined load level is equal to or greater than a predetermined rugged region entry threshold value, and
determine that the vehicle is in the normal region when the determined load level is smaller than the predetermined rugged region entry threshold value.

8. The vehicle control apparatus of claim 5, wherein the load level controller is configured to calculate a slope change rate per unit time in a state where a vehicle is in the rugged region.

9. The vehicle control apparatus of claim 5, wherein the load level controller is configured to determine that a vehicle is in the sudden region when a slope change rate per unit time is equal to or greater than a predetermined sudden region entry threshold value.

10. The vehicle control apparatus of claim 5, wherein when a vehicle is in the normal region, the load level controller is configured to control the engine power output based on a first map to which an engine power output for each load level stage based on gravitational acceleration is mapped.

11. The vehicle control apparatus of claim 10, wherein when the vehicle is in the rugged region, the load level controller is configured to control the engine power output based on a second map to which an engine power output for each load level calculated based on the GPS information is mapped.

12. The vehicle control apparatus of claim 11, wherein when the vehicle is in the sudden region, the load level controller is configured to control the engine power output based on a third map that provides a correction factor based on a slope change rate per unit time for the engine power output based on the second map.

13. The vehicle control apparatus of claim 11, wherein the load level controller is configured to: minutely divide and set a section of the engine power output based on the load level based on the GPS information of the second map compared with the load level stage of the first map, and increase the engine power output initially when the vehicle enters the sudden region.

14. The vehicle control apparatus of claim 1, wherein:
the load level calculator is configured to determine the load level of the road based on the GPS information in real time, and
the load level controller is configured to control the engine power output for each region of the plurality of regions.

15. A vehicle system comprising:
a global positioning system (GPS) receiver configured to receive GPS information; and
a load level controller configured to:
 determine a load level of a road based on the GPS information,
 classify the road into a plurality of regions based on the determined load level,
 differentially control an engine power output for each region of the plurality of regions,
 a first map to which an engine power output for each load level stage calculated based on gravitational acceleration is mapped; and
 a second map to which an engine power output for each load level stage calculated based on the GPS information is mapped.

16. A vehicle control method comprising:
determining, by a load level calculator, a load level of a road based on global positioning system (GPS) information;
classifying, by a load level controller, the road into a plurality of regions based on the determined load level; and
differentially, by the load level controller, controlling an engine power output for each region of the plurality of regions using a map for the engine power output for each region of the plurality of regions,
wherein the map includes:
 a first map to which an engine power output for each load level stage calculated based on gravitational acceleration is mapped; and
 a second map to which an engine power output for each load level stage calculated based on the GPS information is mapped.

17. The vehicle control method of claim 16, wherein determining of the load level includes:
 calculating an altitude variation based on a position change of a vehicle and the GPS information,
 calculating a distance variation by differentiating a vehicle speed of the vehicle, and
 calculating the load level by dividing the altitude variation by the distance variation.

18. The vehicle control method of claim 16, wherein the plurality of regions includes a normal region, a rugged region, and a sudden region based on the determined load level.

19. The vehicle control method of claim 18, wherein classifying the road into the plurality of regions includes:
 determining that a vehicle is in the rugged region when the determined load level is equal to or greater than a predetermined rugged region entry threshold value, and
 determining that the vehicle is in the normal region when the determined load level is smaller than the predetermined rugged region entry threshold value.

20. The vehicle control method of claim 18, wherein classifying of the road into the plurality of regions includes:
 calculating a slope change rate per unit time in a state where a vehicle is in the rugged region;
 determining that the vehicle is in the sudden region when the slope change rate per unit time is equal to or greater than a predetermined sudden region entry threshold value;
 when the vehicle is in the normal region, controlling the engine power output based on a first map to which an engine power output for each load level stage based on gravitational acceleration is mapped;
 controlling the engine power output based on a second map to which an engine power output for each load level stage based on the GPS information is mapped; and
 when the vehicle is in the sudden region, controlling the engine power output based on a third map that provides a correction factor based on the slope change rate per unit time for the engine power output based on the second map.

* * * * *